Figure 1:
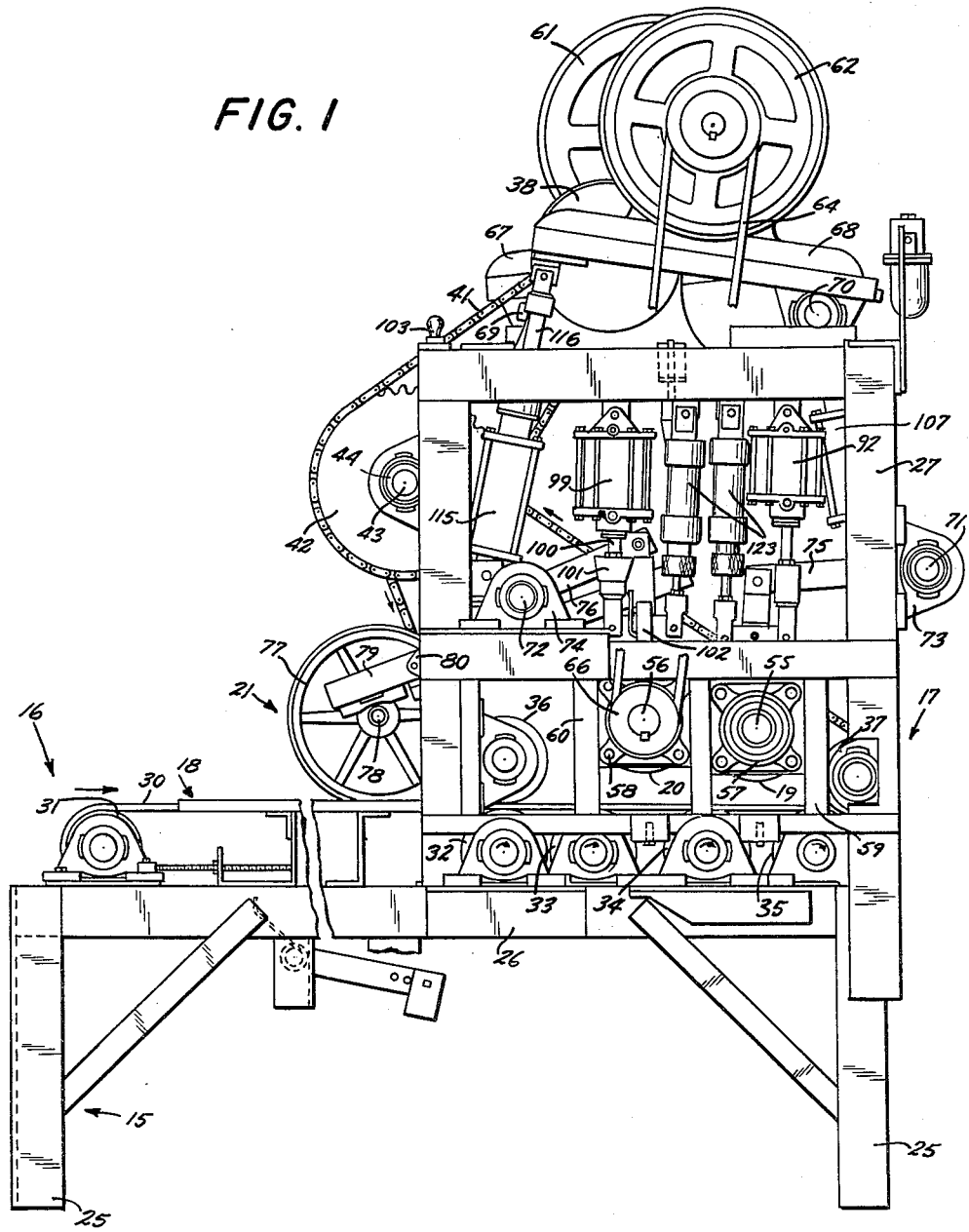

Aug. 8, 1961 L. B. JONES 2,995,024
APPARATUS FOR TREATING HIDES
Filed Aug. 29, 1958 6 Sheets-Sheet 2

INVENTOR.
LEROY B. JONES
BY
Kane, Dalsimer and Kane
ATTORNEYS

Aug. 8, 1961    L. B. JONES    2,995,024
APPARATUS FOR TREATING HIDES
Filed Aug. 29, 1958    6 Sheets-Sheet 3

INVENTOR
LEROY B. JONES
BY
Kane, Dalsimer and Kane
ATTORNEYS

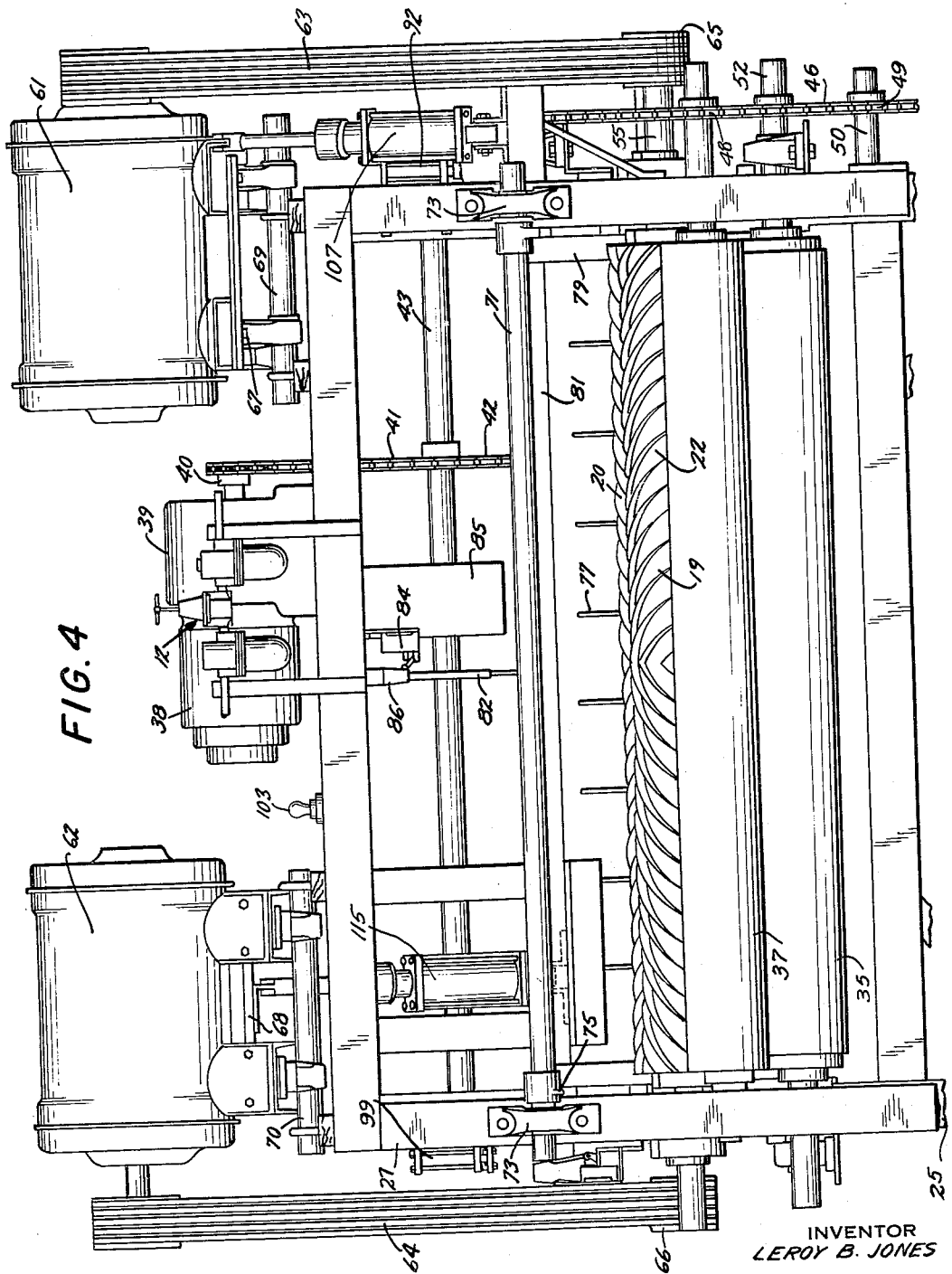

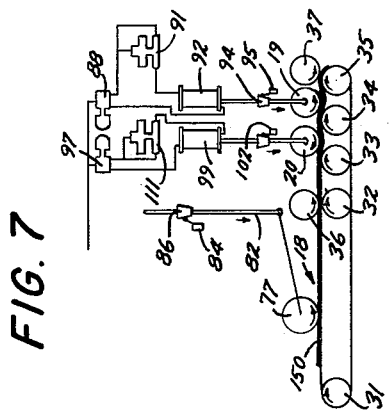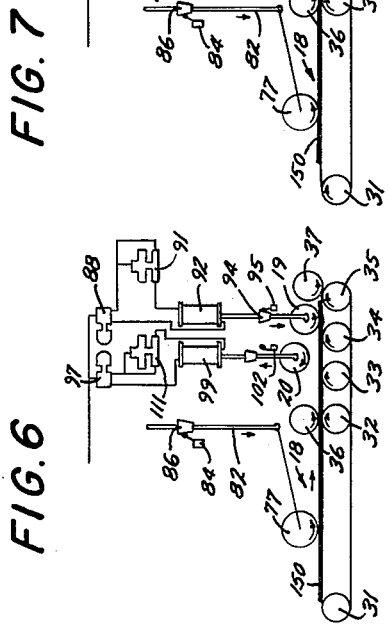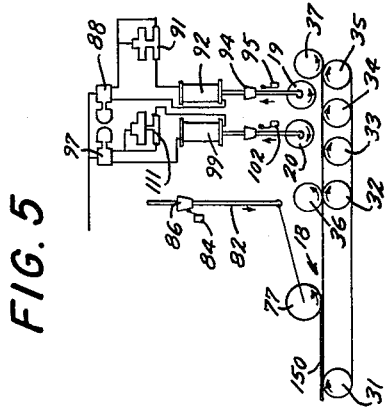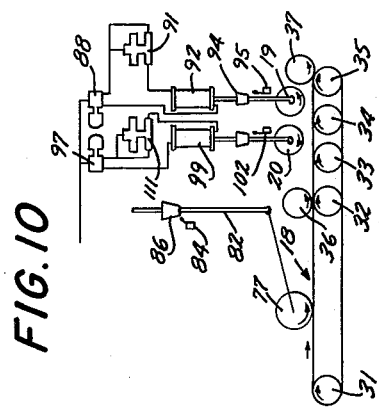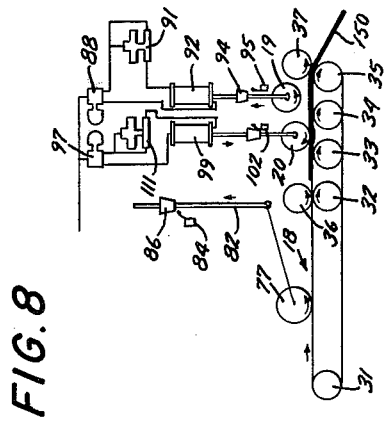

Aug. 8, 1961  L. B. JONES  2,995,024
APPARATUS FOR TREATING HIDES
Filed Aug. 29, 1958  6 Sheets-Sheet 6

INVENTOR
LEROY B. JONES
BY
Kane, Dalsimer and Kane
ATTORNEYS

United States Patent Office 2,995,024
Patented Aug. 8, 1961

2,995,024
APPARATUS FOR TREATING HIDES
Leroy B. Jones, Endicott, N.Y., assignor to Endicott Johnson Corporation, Endicott, N.Y., a corporation of New York
Filed Aug. 29, 1958, Ser. No. 758,128
4 Claims. (Cl. 69—41)

My invention relates to an improved apparatus and method of treating hides in the various set out and beam house operations in a tannery and is particularly applicable to an improved set-out apparatus and method for use in removing wrinkles in the portion of a hide known as a bend used in providing sole leather.

The apparatus generally in use for performing the set-out operation in removing wrinkles from the portion of a hide from which sole leather is made requires two passes of the hide or bend through the apparatus in order to treat the entire length thereof. This is also true of the apparatus generally in use for performing the various beam house operations such as unhairing, fleshing and scudding. This double operation or treatment of each hide or bend is wasteful in that it is time consuming and, in addition, requires considerable manual labor in transporting the hides from the exit portion to the entry portion of the machine and reversing them for the second pass through the apparatus.

It is a particular object of the present invention to overcome the difficulties heretofore encountered in this respect and to provide an improved hide treating apparatus and method—particularly a set-out apparatus and method—for effectively treating the entire length of a hide or bend on a single pass through the apparatus.

Further objects are the provision of improved apparatus of the above character for treating hides and bends of simplified construction which can be effectively used by relatively unskilled operators for treating a hide or bend from end to end and which is relatively sturdy and strong so as to give effective service over a long period of time with comparative freedom from wear and maintenance.

A further object is the provision of an improved attachment or auxiliary station of the above character for slitting or severing a hide or bend upon the conclusion of its pass through the apparatus and after it has been subjected to the normal set-out or other treatment.

My invention contemplates the provision of improved hide treating apparatus having a conveyor for transporting the hide or bend through the apparatus and having a pair of rotatable hide treating tools disposed above the conveyor—one relatively nearer to the exit portion rotating in the direction of feed and one relatively nearer the entry portion and rotating in a counter direction to the direction of feed. Both hide treating tools are shiftable between an inoperative position spaced above the conveyor and an operative position in engagement with the conveyor or with a hide positioned thereon.

Automatic control mechanism is provided whose operation is initiated by a hide on the entry portion of the conveyor to cause the sequential shifting of the hide treating tools between inoperative and operative positions to insure the treatment of the entire length of the hide from end to end. The leading and intermediate portions of a hide passing through my apparatus is subjected to treatment by a tool rotating in the direction of feed and the intermediate and trailing portions of the hide are subjected to treatment by a tool rotating in a direction counter to the direction of feed.

According to one aspect of my invention, an auxiliary slitting station is provided at the exit portion of the machine for slitting the hide longitudinally upon the conclusion of its pass through the machine and after it has been subjected to the set-out or other treating operation.

Figure 2:
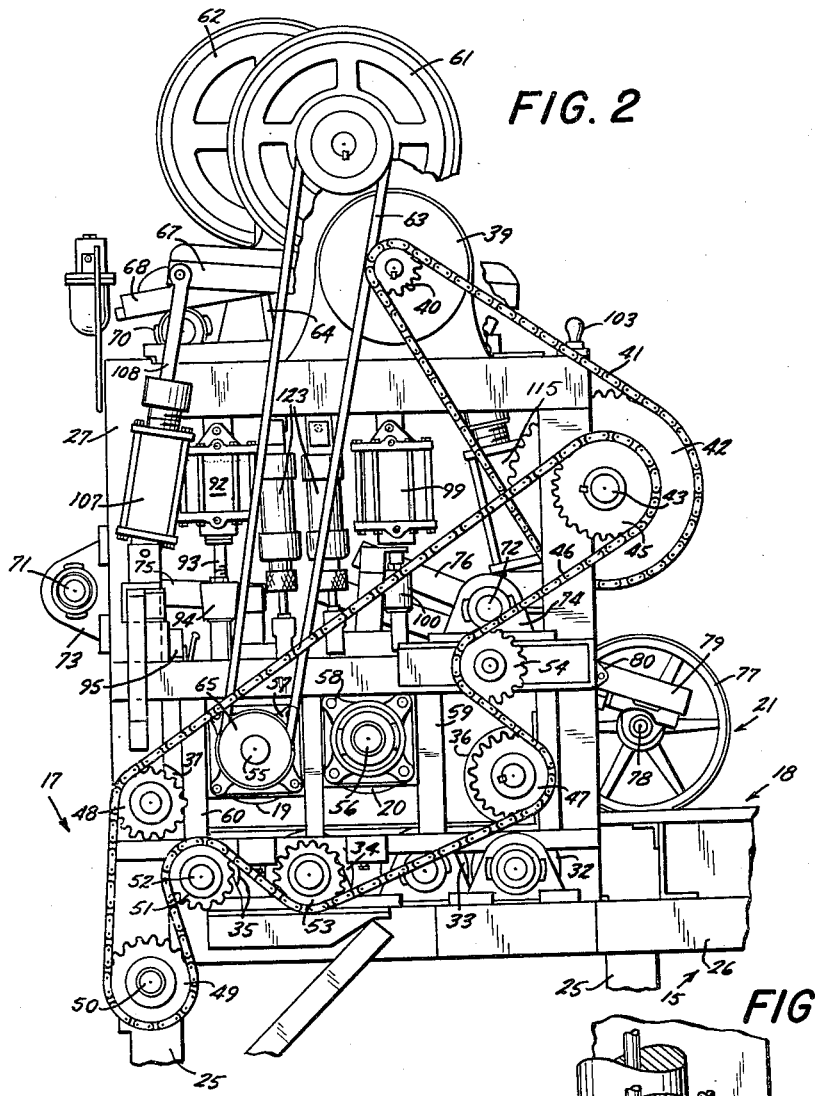
Figure 13:
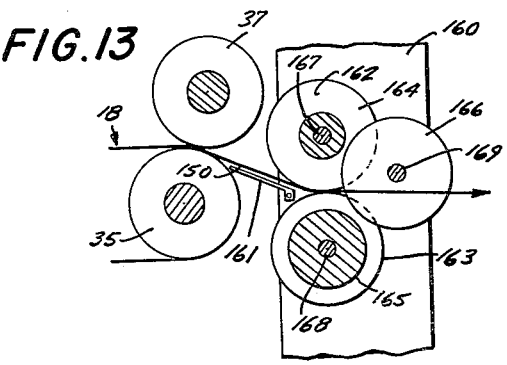
Figure 14:
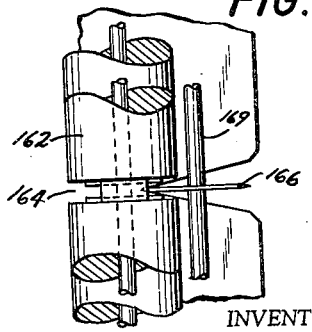
Figure 3:
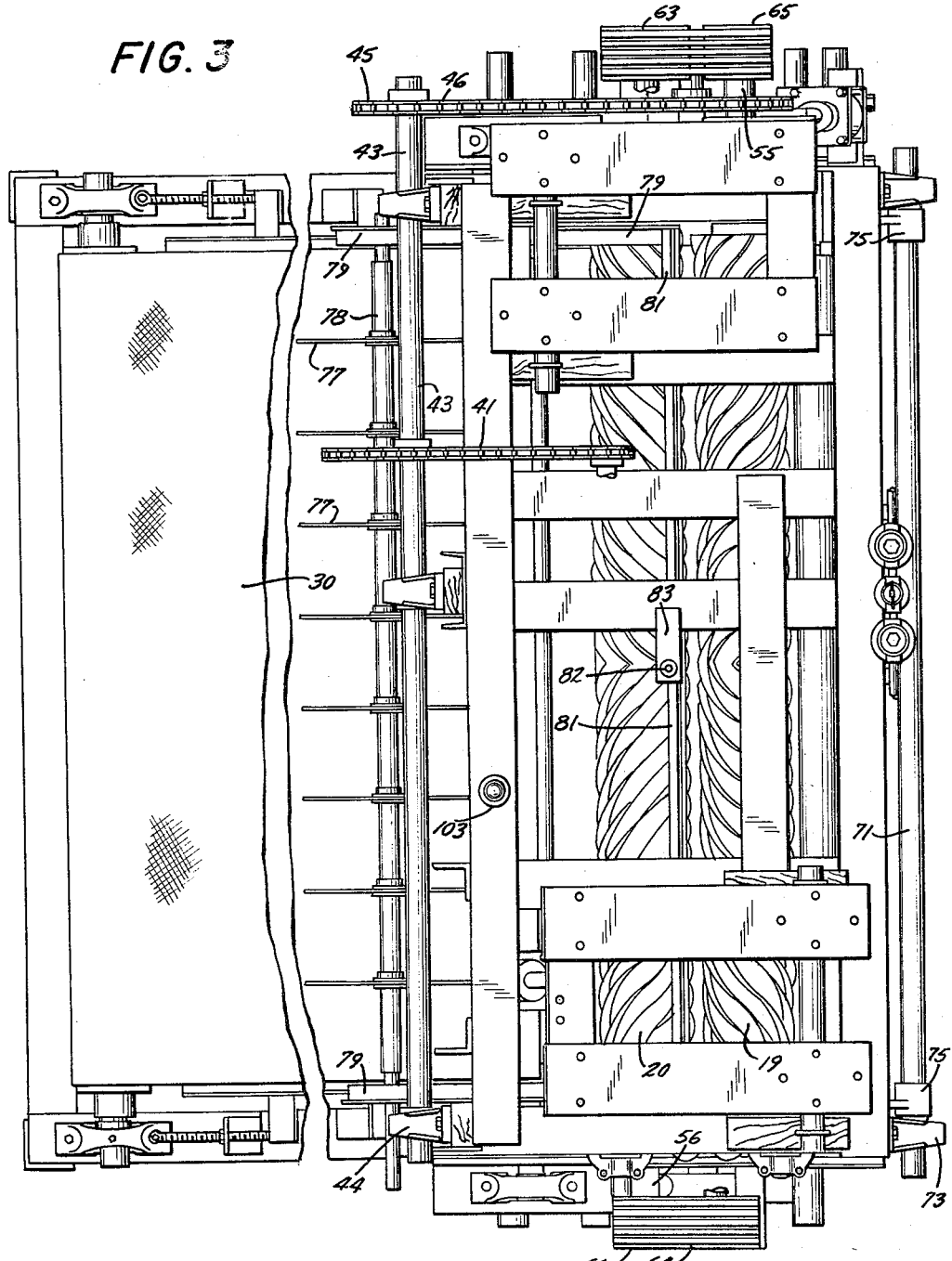
Figure 11:
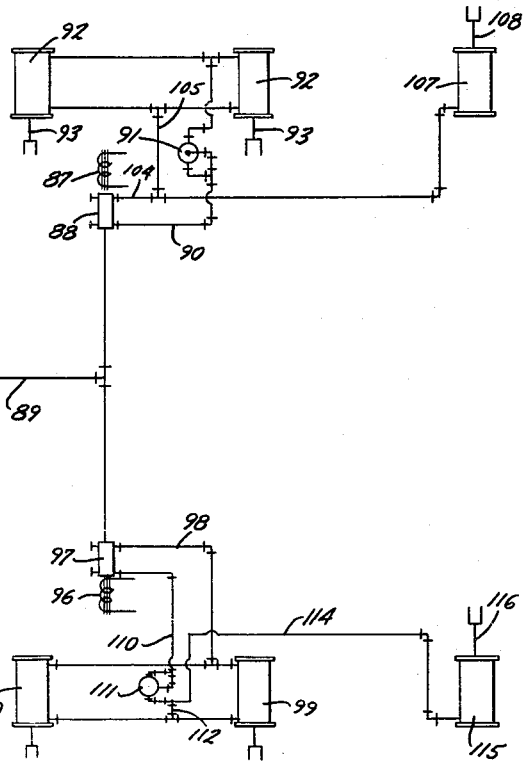
Figure 12:
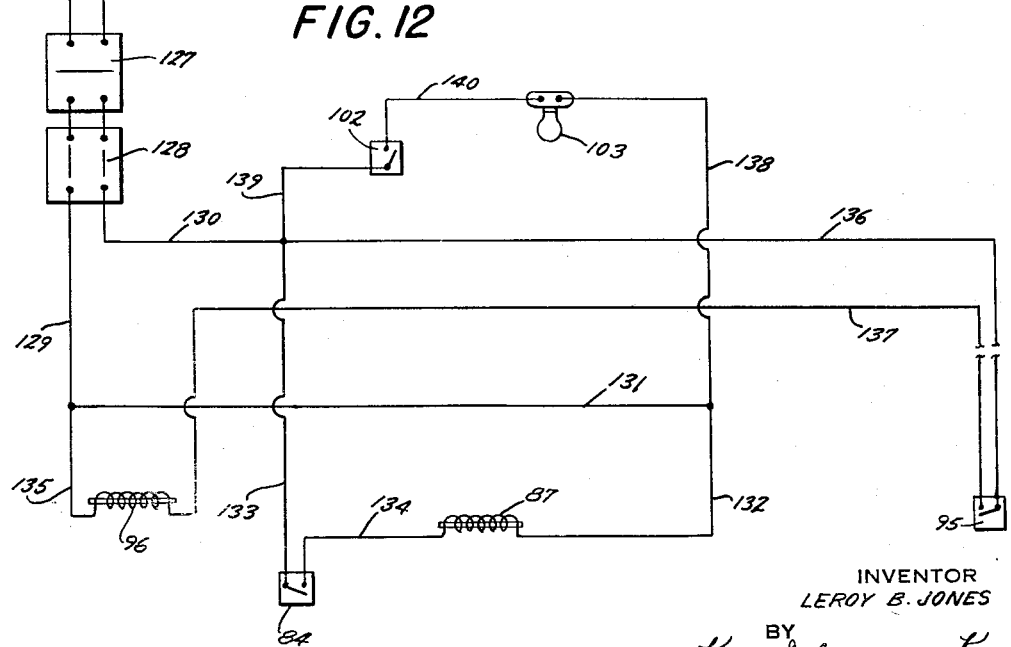

In the accompanying drawings,
FIG. 1 is an elevational view of one side of apparatus for treating hides or bends embodying my invention;
FIG. 2 is an elevational view showing the opposite side of the apparatus;
FIG. 3 is a top plan view of the apparatus;
FIG. 4 is an elevational view from the exit end of the apparatus;
FIGS. 5 to 10 inclusive are diagrammatic views in side elevation illustrating the sequential operation of the apparatus together with the improved process performed thereby as the hide or bend is transported through the apparatus;
FIG. 11 is a diagram of the schematic circuit which may be employed in the apparatus;
FIG. 12 is a diagram of the electrical circuit which may be employed in the apparatus;
FIG. 13 is a fragmentary side view in section showing an auxiliary station or attachment which may be applied to my apparatus for slitting the hide or bend longitudinally; and
FIG. 14 is a fragmentary plan view of the auxiliary station or attachment.

As shown primarily in FIG. 1, my improved apparatus comprises generally a supporting structure or frame 15 presenting an entry portion 16 and an exit portion 17 and having a conveyor 18 supported thereon so as to transport the hides from the entry portion to the exit portion. Disposed above the conveyor are a pair of rotatable hide treating tools 19 and 20 which are vertically shiftable between inoperative positions spaced above the conveyor to operative positions in engagement with the conveyor or in engagement with a hide transported thereon. The first hide treating tool 19 is located nearer to the exit portion of the conveyor and is rotated in the direction of feed, while the second hide treating tool 20 is located nearer to the entry portion of the machine and is rotated in a counter direction to the direction of feed.

Control means including the feeler mechanism or wheels 21, located in the path of movement of the hide between the entry portion of the machine and the second hide treating tool, is provided for causing the sequential shifting of the first work treating tool and the second work treating tool between inoperative and operative positions whereby the entire length of the hide is treated as it is transported through the apparatus.

Referring now to the supporting structure 15, it comprises generally legs 25 supporting horizontal frame members 26 on which the conveyor 18 is mounted. Extending upwardly from the horizontal frame members 26 is the super structure 27 serving to support the rotary work tools 19 and 20, the feeler mechanism 21, the motors, drive rollers and hydraulic or pneumatic system.

The conveyor 18 preferably comprises an endless belt 30 supported on a plurality of rollers 31, 32, 33, 34 and 35 in such a way that the upper flight of the conveyor belt is fed from the entry portion to the exit portion of the machine. A plurality of the rollers such as rollers 31 to 34 inclusive may be idler rollers, while the end roller 35 may be driven roller rotated in a clockwise direction as viewed in FIG. 1 so that the conveyor belt will be operated to feed the hides through the machine as previously indicated.

Cooperating with the conveyor belt are a pair of feed rollers 36 and 37 which are rotated in a counter-clockwise direction as viewed in FIG. 1 so as to cooperate with the conveyor belt in feeding the hides. In this connection, the feed rollers preferably have a frictional surface made of a suitable material such as natural or synthetic rubber or some other flexible resilient material.

The relative position of the feed rollers may be varied, but I find that satisfactory results are obtained if the feed roller 36 is positioned in approximately superposed registry with the idler roller 32 and if the feed roller 37 is positioned slightly beyond the drive roller 35 towards the exit end of the machine with the rollers 36 and 32 and 37 and 35 positioned so as to frictionally engage the conveyor belt and any hide that may be transported thereon.

The feed rollers 36 and 37 and the drive roller 35 may be driven in any suitable manner. Thus in the illustrated embodiment (see FIGS. 1–4), I have shown a motor 38 connected to gear box 39 so as to drive sprocket wheel 40 which, in turn, is connected by sprocket chain 41 to sprocket wheel 42 mounted on the jack shaft 43 suitably journaled in bearings 44 mounted on the super structure 27. The end of jack shaft 43 is provided with a sprocket 45 connected by sprocket chain 46 around the sprocket wheels 47 and 48 mounted respectively on the ends of the shafts which support feed rollers 36 and 37 so as to rotate them in the same direction.

Between the sprockets 47 and 48, the sprocket chain 46 extends around the guide idler sprocket 49 mounted on a stud shaft 50 mounted on the rear leg of the supporting structure. The opposite or outer side of the sprocket chain is then engaged with a sprocket 51 mounted on the end of the shaft 52 supporting drive roller 35 for the conveyor belt. Thus, the drive roller 35 is driven in an opposite direction to the feed rollers 36 and 37. Between sprockets 47 and 51, I provide another idler and guide roller 53 and between sprockets 45 and 47, I provide an adjustable take-up sprocket 54.

The ratio of the sprocket sizes and the size of the feed and drive rollers is such that the surface rate of speed of the feed belt and the drive rollers is the same. It will thus be seen that when the motor 38 is placed in operation, it will drive the feed belt and drive rollers so that a hide or bend placed on the upper flight of the conveyor belt at the entry portion 16 thereof will be fed towards the exit portion 17 first by the conveyor belt alone and then the leading edge will be gripped between the feed roller 36 and the conveyor belt backed by the idler roller 32. Thereafter, the hide will continue to be fed both by the conveyor belt and the feed roller 36 until the leading edge of the hide is engaged by the feed roller 37 with the result that the hide will be gripped between the feed roller 37 and the conveyor belt backed by the drive roller 35. This operation will continue until the entire hide is fed from the machine.

Each of hide treating tools 19 and 20 may be of the usual design for the particular operation to be performed. The tools shown are intended for the purpose of performing the set-out operation for smoothing and removing the wrinkles from the portion of a hide used in making sole leather which is known as a bend. For this purpose, each tool is formed with a pair of helical blades 22 extending outwardly from the center of the roller. The helices on the two tools are arranged in opposite relationship so that when the tools are rotated in their respective directions of operation, the helices serve to spread the two sides of the hide outwardly from the center.

The position of the work tools or work cylinders 19 and 20 with respect to the feed rollers 36 and 37 may be varied. In the illustrated embodiment, I have shown hide treating tools positioned between the feed rollers. As previously indicated, the hide treating tools are shiftable between inoperative positions spaced above the conveyor belt to operative positions in frictional engagement therewith or with a hide positioned thereon. For this purpose, the supporting shafts 55 and 56 for the hide treating tools 19 and 20 are mounted adjacent their opposite ends in bearing blocks 57 and 58 mounted in frame structures 59 and 60 for relative vertical shift movement. When the bearing blocks 57 and 58 are elevated, the hide treating tools are in inoperative position and when the bearing blocks are lowered, the hide treating tools are in operative position.

The rollers 33, 34 and 35 are offset horizontally from the two hide treating tools 19 and 20 so as to be disposed in different vertical planes. Also, the lower surfaces of the hide treating tools are positioned in a plane beneath the normal plane of the upper surface of the endless conveyor belt when the tools are disposed in their operative positions. Accordingly, the conveyor belt and any hide positioned thereon are partially wrapped around the periphery of the work tools so that a relatively extended length thereof is subjected to treatment at the same time as shown in the diagram FIGS. 6 to 8.

Suitable means are provided for causing the rotation of hide treating tool 19 in the direction of feed, i.e. in a counterclockwise direction as viewed in FIG. 1 at a relatively higher surface rate of speed than the surface rate of speed of the conveyor belt and feed rollers and for rotating the work tool 20 in a counter direction to the direction of feed at a similar relatively higher rate of speed. In this connection, I have found that optimum results are obtained if the surface rate of speed of the work tools is considerably higher than the surface rate of speed of the conveyor belt. As an example, very good results have been obtained where the speed of the conveyor belt has been approximately 80 to 100 feet per minute, while the surface speed of the hide treating tools has been approximately 3,500 feet per minute.

One form of drive mechanism is illustrated in the accompanying drawings and comprises separate motors 61 and 62 connected by drive belts 63 and 64 to pulleys 65 and 66 mounted on the ends respectively of shafts 55 and 56. The motors are mounted on platforms 67 and 68 which are pivotally mounted as shown at 69 and 70 so that the motors and platforms can pivot upwardly and downwardly with the sifting of the hide treating tools to maintain the belts 63 and 64 in proper relationship with the pulleys on the motors and shafts. In this connection, a proper relationship is more readily maintained if the motor 61 is mounted slightly forwardly of the vertical plane intersecting hide treating tool 19 and if the platform 67 is pivoted at its leading edge. Similarly, better results are obtained if the motor 62 is mounted slightly rearwardly of the hide treating tool 20 with platform 68 pivoted near its trailing edge.

I have found that it is desirable to provide suitable mechanism so that both ends of the hide treating tools will shift uniformly and equally between inoperative and operative positions and to prevent tilting of the hide treating tools which would result in lack of uniformity in the treatment of the two sides of the hides. For this purpose, I provide equalizer bars 71 and 72 mounted in bearing brackets 73 and 74 which, in turn, are supported by the super structure 27. The opposite ends of the equalizer bars 71 and 72 are connected by linkage 75 and 76 to the sliding bearing blocks 57 and 58 at the two ends of the supporting shafts 55 and 56. Thus, the equal and uniform shifting of the bearing blocks at the two ends of the hide treating tools is insured by the connections to the rotary equalizing rods.

Suitable control mechanism is also provided for automatically shifting the hide treating tools between inoperative and operative positions and for correspondingly shifting the drive motors 61 and 62. Thus, when a hide is present on the entry portion of the conveyor belt, the hide treating tool 19 is caused to shift downwardly into operative position after a reasonable time delay, and thereafter the hide treating tool 20 is caused to shift downwardly to operative position.

When the hide is absent from the entry portion of the conveyor belt, the hide treating tool 19 is caused to shift upwardly to inoperative position and after a reasonable time delay the hide treating tool 20 is likewise caused to shift to inoperative position. This sequential operation is caused by an electrically controlled pneumatic or fluid system.

For this purpose, I provide suitable sensing or feeler mechanisms 21 between the entry end of the apparatus and the hide treating tool 20. The feeler mechanism consists of a plurality of discs or wheels 77 mounted for rotation on shaft 78 supported at its opposite ends in the bracket arms 79. The bracket arms are pivotally mounted at an intermediate portion in brackets 80 attached to the forward portion of the super structure 27. The opposite ends of the brackets 79 are connected together by a rod 81, which in turn, carries a vertical rod 82 shiftably supported at its upper end in bracket 83, carried by the frame work of the super structure. Thus, when the wheels 77 pivot upwardly, the member 81 and rod 83 will shift downwardly.

A micro switch 84 is mounted on a bracket 85 carried by the super structure in a position to be operated by tapered cam 86 mounted on vertical rod 83. When a hide is present on the entry portion of the conveyor belt, it causes the feeler wheels 77 to shift upwardly with the result that member 81, vertical rod 83 and tapered cam 86 shift downwardly to operate the micro switch 84. The operation of micro switch 84 causes the operation of a solenoid 87 shown in the pneumatic and electric circuit diagram FIGS. 11 and 12 which, in turn, controls the pneumatic valve 88 so that pneumatic fluid under pressure can flow from supply line 89 through the valve 88, line 90, time delay 91 to the upper end of pneumatic cylinders 92 which, as shown in FIGS. 1, 2 and 4, are connected between super structure 27 and the bearing blocks 57. The result is that the hide treating tool 19, after a short time delay, is shifted downwardly from inoperative position to operative position just as the leading end of the hide approaches the station for hide treating tool 19. Mounted on the piston rod 93 of one of the pneumatic cylinders 92 is a tapered cam 94 (see FIG. 2) which causes the operation of micro switch 95 when work cylinder 19 is shifted downwardly to operative position.

The operation of micro switch 95 causes the operation of solenoid 96 controlling pneumatic valve 97 so as to cause pneumatic fluid under pressure to flow from supply line 89 through valve 97 and line 98 to the upper end of pneumatic cylinders 99. The result is that piston rods 100 are shifted downwardly causing bearing blocks 58 and hide treating tool 20 to shift from inoperative position to operative position without any time delay. It will be appreciated that when hide treating tool 20 shifts downwardly, the leading portion of the hide has already passed the station for this hide treating tool with the result that hide treating tool 20 commences treating the hide at an intermediate portion thereof. Mounted on the piston rod 100 of one of the cylinders 99 (see FIG. 1) is a tapered cam 101 which causes the operation of micro switch 102 when the piston rod and work cylinder 20 are shifted downwardly. The operation of micro switch 102 completes the circuit to a suitable signal such as light 103 which may be mounted on a clearly visible place at the top of the machine. When the light shuts off after each cycle of operation, it indicates to the machine operator that another hide may be fed into the entry portion of the machine.

When the trailing end of the hide has cleared past the feeler mechanism 21, the feeler wheels 77 shift downwardly with the result that rod 82 and cam 86 shift upwardly permitting micro switch 84 to open. The result is that solenoid 87 is de-energized and pneumatic valve 88 is shifted so that pneumatic fluid under pressure flows from supply line 89 through valve 88, lines 104 and 105 to the lower ends of pneumatic cylinders 92 causing the piston rods 93 and work cylinder 19 to move upwardly to inoperative position. It will thus be seen that the hide treating cylinder 19 shifts to operative position immediately prior to the time that the leading end of the hide reaches the station for this cylinder and is caused to shift upwardly while the intermediate portion of the hide is positioned at this work station. Thus, hide treating tool 19 treats the leading end and an intermediate portion of the hide only.

When the work tool 19 is shifted upwardly, pneumatic fluid also flows through line 104 to the lower end of cylinder 107 shifting piston rod 108 upwardly. Piston rod 108, in turn, is connected to platform 67 which supports motor 61 which, in turn, drives the hide treating tool 19. Accordingly, motor 61 is shifted upwardly with the work treating cylinder. In this connection, when the solenoid valve 88 is shifted to a position to cause hide treating tool 19 to shift downwardly, cylinder 107 permits the motor to shift downwardly therewith due to the fact that fluid may escape through supply line 104 and valve 88.

When work cylinder 19 is returned to inoperative position, piston rod 93 and cam 94 shift upwardly permitting micro switch 95 to open with the result that solenoid valve 97 is shifted to permit pneumatic fluid under pressure to flow from supply line 89 through valve 97 and line 110 to time delay valve 111. Time delay valve is adjusted so that after a reasonable delay in time, fluid flows through the time delay valve and through line 112 to the lower end of pneumatic cylinders 99 causing work treating tool 20 to shift upwardly to inoperative position. The delay of time delay valve 111 is regulated so that hide treating tool 20 will continue in operative position until the trailing end of the hide clears past this work station. Thus, the hide treating tool 20 treats the hide from an intermediate portion thereof to the trailing end thereof.

When hide treating tool 20 is returned to inoperative position, piston rod 100 and tapered cam 101 likewise shift upwardly permitting micro switch 102 to open with the result that the circuit for signal light 103 is opened and the light shuts off. The shutting off of the light indicates to the machine operator that another hide may be fed into the machine.

When the hide treating tool 20 is shifted upwardly to inoperative position, its operating motor 62 is likewise shifted upwardly and this operation is caused by a similar mechanism to that used for motor 61. Thus, pneumatic fluid line 114 connects with time delay valve 111 at one end and to the lower end of pneumatic cylinder 115 at the other end. Upon operation of time delay valve 111 after a reasonable delay, pneumatic fluid under pressure flows through line 114 causing piston rod 116 to shift upwardly. The upper end of piston rod 116 is connected to platform 68 supporting motor 62. When the hide treating tool 29 is shifted downwardly, the pneumatic fluid from cylinder 115 is vented through line 114, time delay valve 111, line 110 and solenoid valve 97. In this connection, it will be seen that the solenoid valves 88 and 97 are arranged so that the pneumatic fluid forced outwardly from the several pneumatic cylinders upon shifting of the pistons therein can vent to atmosphere through the valves.

The complete pneumatic circuit is shown in FIG. 11. The pneumatic fluid enters the system through line 118 from a suitable source such as a pressure fluid reservoir. The fluid then passes through pressure regulating valve 119, line 120 to the regulating devices 121 for extracting water and injecting a small quantity of oil into the fluid. From the regulators 121, the pneumatic fluid travels through the supply line 89 to the solenoid valves 88 and 97.

A line 122 connects supply line 120 to the small shock absorbing cylinders 123 which connect between the super structure 27 and the bearing blocks 57 and 58. The shock absorbing cylinders serve to ease movement of the hide treating tools 19 and 20 between the extreme limits of their operative and inoperative positions.

The electrical circuit for the system is diagrammatically illustrated in FIG. 12. Thus, the power enters through power lines 125 and 126 through a main switch 127 and fuse box 128 to leads 129 and 130. Lead 129 is connected by lead 131 to lead 132 connected to one end of the winding of solenoid 87. Lead 130 is connected by lead 133 to one side of the micro switch 84. The other side of the micro switch is connected by lead 134 to the opposite end of the winding of solenoid 87. Thus, when micro switch 84 is closed, the circuit to solenoid 87 is completed.

Lead 129 is connected by lead 135 to one end of the winding of solenoid 96 while lead 130 is connected by lead 136 to one side of the micro switch 95. The opposite side of the micro switch is connected by lead 137 to the opposite end of the winding of solenoid 96. Thus, when micro switch 95 is closed, the circuit to the solenoid 96 is completed.

Lead 129 is also connected by leads 131 and 138 to one terminal of the socket for lamp 103. Lead 130 is connected by lead 139 to one side of the micro switch 102 and the opposite side of the micro switch is connected by lead 140 to the other terminal of the socket for lamp 103. Thus, when micro switch 102 is closed, the circuit for lamp 103 is completed.

The operation of the device is illustrated diagrammatically in FIGS. 5 to 10 inclusive. Thus, in FIG. 5, a hide 150 is shown entering the machine with the leading edge beneath the feeler wheels 77 so as to cause them to shift upwardly with the result that micro switch 84 is caused to operate which, in turn, causes the operation of solenoid valve 88 with the result that fluid flows through time delay valve 91. After a reasonable time delay, the fluid flows through the time delay valve 91 to the upper end of cylinder 92 shifting hide treating tool 19 downwardly to the position shown in FIG. 6 just prior to the time that the leading edge of the hide arrives at that station. Accordingly, the tool 19 treats the leading end of the hide as shown in FIG. 6. When work tool 19 is shifted downwardly, micro switch 95 is operated causing the operation of solenoid valve 97 with the result that pneumatic fluid flows to the upper end of pneumatic cylinder 99 shifting hide treating tool 20 downwardly to the position shown in FIG. 7 so that the hide treating tool 20 commences to operate on an intermediate portion of the hide. It will be seen that in the position shown in FIG. 7, both hide treating tools are operating simultaneously. When the hide treating tool 20 shifts downwardly, micro switch 102 is operated causing the signal light 103 to turn on.

When the trailing end of the first hide clears the feeler wheels 77, micro switch 84 opens with the result that solenoid valve 88 causes pneumatic fluid to flow to the lower end of cylinder 92 returning hide treating tool 19 to inoperative position as shown in FIG. 8 with the result that the trailing end of the hide is treated solely by hide treating tool 20.

When hide treating tool 19 returns to operative position, micro switch 95 opens with the result that solenoid valve 97 causes pneumatic fluid to flow to time delay valve 111. After a reasonable time delay, time delay valve 111 causes hydraulic fluid to flow to the lower end of cylinders 99 with the result that hide treating tool 20 is returned to inoperative position after the trailing end of hide 150 has cleared the station for tool 20, as shown in FIG. 9. The return of hide treating tool 20 to its inoperative position causes micro switch 102 to open with the result that the signal light shuts off indicating that the apparatus has now returned to its original position and that the operator may now feed another hide into the machine.

In FIGS. 13 and 14, I have illustrated an optional attachment which may be applied to the exit end of the machine for splitting a hide or bend as it is fed from the machine. Thus, a supplemental frame structure 160 may be attached to frame 15 and a stainless steel guide plate 161 may be provided for guiding the hide, as it exits from the conveyor belt, between the two rubber feed rolls 162 and 163. The feed rolls 162 and 163 are provided with circumferential slots 164 and 165 at the central portion thereof in alignment with each other. A rotary cutting blade 166 is mounted adjacent the rolls 162 and 163 so that the peripheral edge thereof protrudes into the slots 164 and 165. The rolls 162 and 163 and the cutting blade 166 are mounted upon suitable shafts 167, 168 and 169, journaled in the frame structure 160.

The shafts 167 and 168 are suitably connected to driving mechanism such as motor 39 so as to rotate the rolls 162 and 163 in a direction of feed at the same surface rate of speed as the conveyor belt 18. Thus, the hide is fed from the conveyor belt between the tools 162 and 163. The shaft 169 and rotary cutting blade 166 are preferably rotated at a higher rate of speed and may be driven by a suitable motor such as one of the motors 61 or 62. The rotation of the cutting blade in the slots of the two feed tools 162 and 163 cuts or splits the hide in the manner shown in FIG. 14. Thus, the hide may be split or cut as desired as it exits from the hide treating apparatus.

It will be seen that I have provided an improved hide treating apparatus and method for performing beam house operations and which is particularly suited for use in performing set-out operations in removing wrinkles from the portion of the hide known as a bend. It will also be seen that my apparatus and method effectively treat the entire length of a hide or bend in a single pass through the apparatus. It will be appreciated that modifications may be made in the illustrated and described embodiment of my invention without departing from my invention as set forth in the accompanying claims.

I claim:

1. Apparatus for treating the entire length of a hide or bend in a single pass through the apparatus which comprises: a supporting structure presenting entry and exit portions; hide conveying means including an endless conveyor belt mounted on the supporting structure and having an upper flight extending between the entry and exit portions, feed rollers in engagement with the upper flight of the conveyor belt and means for rotating the feed rollers and the endless belt in a direction to feed a hide over the upper flight from the entry portion to the exit portion; a first rotatably mounted hide treating tool disposed above the upper flight of the conveyor belt relatively nearer to the exit portion of the apparatus for treating the leading end of the hide and shiftably supported on said supporting structure for movement between an inoperative position spaced above the upper flight of the conveyor belt and an operative position in frictional engagement with the upper flight of the conveyor belt or with a hide disposed thereon; a second rotatably mounted hide treating tool disposed above the upper flight of the conveyor belt relatively nearer to the entry portion of the apparatus for treating the trailing end of a hide and shiftably supported on said supporting structure for movement between an inoperative position spaced above the upper flight of the conveyor belt and an operative position in frictional engagement with the upper flight of the conveyor belt or with a hide disposed thereon; means for rotating said first hide treating tool in the direction of feed and said second hide treating tool in a counter direction of feed at a relatively greater surface rate of speed than said conveyor belt and feed rollers; first tool shifting mechanism for shifting said first hide treating tool between operative and inoperative positions and for retaining it in said positions; second tool shifting mechanism for shifting said second hide treating tool between operative and inoperative positions and for retaining it in said positions; a first control means for controlling the shifting of said first hide treating tool including a feeler mechanism located between the entry portion of the machine and the second hide treating tool in a position to be actuated by the presence and absence of a hide on the entry portion of the upper flight of the conveyor belt and a switch operatively connected to the first tool shifting mechanism and operatively associated with the feeler mechanism to cause the first hide treating tool to shift downwardly into operative position when a hide is present and to cause it to shift upwardly to inoperative position when a hide is absent; and second control means for controlling the shifting of the second hide treating tool and including a switch operatively connected to the second tool shifting mechanism and operatively associated with the first tool shifting mechanism to cause the second hide treating tool to shift downwardly to operative position when the first hide treating tool is in operative position and to cause it to shift upwardly to inoperative position when the first hide treating tool is in inoperative position.

2. Apparatus for treating the entire length of a hide bend in a single pass through the apparatus as set forth in claim 1 in which time delay means is associated with said first tool shifting mechanism for delaying the shifting of the first hide treating tool to operative position and time delaying means is associated with said second tool shifting mechanism for delaying the return of the second hide treating tool to inoperative position.

3. Apparatus for treating the entire length of a hide or bend in a single pass through the apparatus as set forth in claim 1 in which the means for rotating said first and second hide treating tools comprises a separate electric motor for each of said tools operatively connected therewith and having means for shifting said motors relative to the supporting structure when said first and second hide treating tools are shifted between operative and inoperative positions.

4. Apparatus for treating the entire length of a hide or bend in a single pass through the apparatus as set forth in claim 1 in which said first and second tool shifting mechanisms include fluid circuits having pistons, cylinders and control valves operatively connected to said switches and said feeler mechanism and said first tool shifting mechanism have cams operatively connected thereto for causing the operation of the respective switches associated therewith.

References Cited in the file of this patent

UNITED STATES PATENTS

| | | |
|---|---|---|
| 618,869 | Hall | Feb. 7, 1899 |
| 745,353 | Hutchinson | Dec. 1, 1903 |
| 806,256 | Hutchinson | Dec. 5, 1905 |
| 1,583,722 | Kehrhahn | May 4, 1926 |
| 2,169,754 | Beyster | Aug. 15, 1939 |
| 2,356,855 | Knowlton et al. | Aug. 29, 1944 |
| 2,666,317 | Griffin | Jan. 19, 1954 |
| 2,686,414 | Griffin | Aug. 17, 1954 |
| 2,686,415 | Griffin | Aug. 17, 1954 |